United States Patent
Camp, Jr. et al.

(10) Patent No.: US 8,762,715 B2
(45) Date of Patent: Jun. 24, 2014

(54) EVENT TRIGGERED PAIRING OF WIRELESS COMMUNICATION DEVICES BASED ON TIME MEASUREMENTS

(75) Inventors: William O. Camp, Jr., Chapel Hill, NC (US); Leland Scott Bloebaum, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 897 days.

(21) Appl. No.: 12/624,466

(22) Filed: Nov. 24, 2009

(65) Prior Publication Data

US 2011/0126009 A1    May 26, 2011

(51) Int. Cl.
  H04L 9/32      (2006.01)
  H04L 9/00      (2006.01)
  H04L 29/06    (2006.01)

(52) U.S. Cl.
  CPC .. H04L 9/00 (2013.01); H04L 9/32 (2013.01); H04L 9/3228 (2013.01); H04L 63/0869 (2013.01)
  USPC ........................................................ 713/168

(58) Field of Classification Search
  CPC ........... H04L 9/00; H04L 9/32; H04L 9/3228; H04L 63/0869
  USPC ........................................................ 713/168
  See application file for complete search history.

(56) References Cited

U.S. PATENT DOCUMENTS

| | | | |
|---|---|---|---|
| 8,260,883 B2 * | 9/2012 | Mooring et al. | 380/270 |
| 2007/0188323 A1 * | 8/2007 | Sinclair et al. | 340/568.1 |
| 2011/0076941 A1 * | 3/2011 | Taveau et al. | 455/41.1 |

OTHER PUBLICATIONS

Rene Mayrhofer and Hans Gellersen; Shake Well Before Use: Intuitive and Secure Pairing of Mobile DevicesIEEE Transactions on Mobile Computing, vol. 8, No. 6, Jun. 2009; pp. 792-806.*
http://www.quora.com/Bump-mobile-phone-application/How-does-Bump-work, printed out in 2013.*
Ramos, G., Hinckley, K., Wilson, A., and Sarin, R., Synchronous Gestures in Multi-Display Environments, in Human-Computer Interaction, Special Issue: Ubiquitous Multi-Display Environments, vol. 24, Issue 1-2, 2009, pp. 117-169; Apr. 21, 2009.*
Holmquist L E et al., "Smart-Its Friends: A Technique for Users to Easily Establish Connections between Smart Artefacts", Technical Note to Ubicomp, Sep. 1, 2001, pp. 116-122, XP008050420.
Hinckley K, "Synchronous Gestures for Multiple Persons and Computers", UIST 2003, Proceedings of the 16ht Annual ACM Symposium on User Interface Software and Technology 2003 Association for Computing Machinery US, Nov. 2, 2003, pp. 149-158, XP002619088.
Annex A to Form PCT/ISA 206 Communication Relating to the Results of the Partial International Search in re International Application No. PCT/US2010/053760 filed Oct. 22, 2010.

* cited by examiner

Primary Examiner — Peter Shaw
(74) Attorney, Agent, or Firm — Coats & Bennett, P.L.L.C.

(57) ABSTRACT

An event-triggered pairing mechanism allows pairing wireless devices having short range interfaces (e.g., Bluetooth devices) by bumping the wireless devices together. A wireless device being paired with a connecting device detects a bump event; exchanges time information about the bump event with the connecting device; authenticates the connecting device based on the exchanged time information; and allows exchange of user data with the connecting device based on verification of the exchanged time information. Once the devices are paired, user content can be securely exchanged between the devices.

20 Claims, 5 Drawing Sheets

EVENT TRIGGERED PAIRING OF WIRELESS COMMUNICATION DEVICES BASED ON TIME MEASUREMENTS

BACKGROUND

The present invention relates generally to wireless communication devices with short-range radio interfaces and, more particularly, to pairing of two or more wireless communication devices.

Many wireless communication devices include short-range radio interfaces to enable connections to be made with other nearby devices without the need for cords or wires to connect the devices together. Bluetooth is one widely deployed standard for short-range wireless communications. Bluetooth devices can detect and establish connections with other Bluetooth devices as they come into range. The Bluetooth standard includes a procedure called pairing to prevent connections from being established with unknown Bluetooth devices. The pairing procedure typically requires a user to confirm the connection being established by inputting a PIN or passcode for the connecting Bluetooth device.

A recent technology called Bump provides a mechanism for pairing wireless devices without the need for the user to enter a PIN or passcode. There are two main parts to the Bump technology: an application running on the Bluetooth device and a matching algorithm running on a server in a network. The Bluetooth devices are equipped with the Bump application and use sensors to detect and report the bump to the network server. The network server then matches two phones that detect the same bump. The network server uses a complex filtering scheme based on the location of the Bluetooth devices and characteristics of the bump event to match the Bluetooth devices. While the Bump technology simplifies pairing from the user perspective, it requires a server in the network to perform the matching and the Bluetooth devices must have Internet access to use the Bump technology for pairing.

Accordingly, there remains a need for pairing mechanisms that simplify the pairing process from the user perspective without requiring additional hardware or Internet access.

SUMMARY

The present invention provides an event-triggered pairing mechanism for pairing wireless devices having short range interfaces (e.g., Bluetooth devices) to form an ad hoc network. The pairing process is initiated responsive to a predetermined user action, such as bumping the two wireless devices together once or twice. In response to the predetermined user action, one of the wireless devices, referred to herein as the requesting device, sends an authentication request to the other wireless device, referred to herein as the responding device. Upon receipt of the authentication request, the responding device determines a first time measurement (e.g., an elapsed time from the user action) and sends the first time measurement to the requesting device. The requesting device determines whether the first time measurement received from the responding device is within predetermined tolerance parameters. If so, the responding device is authenticated to the requesting device and the requesting device allows exchange of user data with the responding device.

In some embodiments, the requesting device may send to the responding device an authentication reply containing a second time measurement for authenticating the requesting device to the responding device. In embodiments where the wireless devices are bumped together twice, the second time measurement may comprise a time interval between successive bumps. The responding device uses the second time measurement to authenticate the requesting device. If the requesting device is authenticated, the responding device allows exchange of user data with the requesting device. Once the wireless devices are paired, user content can be securely exchanged between the devices.

Some embodiments of the invention comprise methods implemented by a wireless device of pairing with a connecting device. One exemplary method comprises detecting a bump event; exchanging time information about the bump event with the connecting device; authenticating the connecting device based on the exchanged time information; and allowing exchange of user data with the connecting device if the connecting device is successfully authenticated.

In some exemplary methods, detecting a bump event comprises detecting at least one of sound or motion associated with the bump event.

In some exemplary methods, the time information comprises one of the time of the bump event, an elapsed time from the bump event; or a time interval between the first and second bumps in the bump event.

Some methods further comprise generating a private session key from the first time information and encrypting/decrypting data exchanged with the connecting device using the private session key.

In some exemplary methods, exchanging time information about the bump event with a connecting device comprises sending an authentication request to the connecting device responsive to the bump event; and receiving first time information from the connecting device responsive to the authentication request.

In some exemplary methods, exchanging time information about the bump event with a connecting device comprises sending second time information to the connecting device responsive to authentication of the connecting device.

Some methods further comprise generating a private session key from at least one of the first and second time information; and encrypting/decrypting data exchanged with the connecting device using the private session key.

In some exemplary methods, the second time information comprises one of the detected time of the bump event, an elapsed time from the bump event; or a time interval between the first and second bumps in the bump event.

In some exemplary methods, exchanging time information about the bump event with a connecting device comprises receiving an authentication request from the connecting device; sending an authentication response containing first time information about the bump event to the connecting device responsive to the authentication request to authenticate the wireless device to the connecting device; receiving an authentication reply from the connecting device responsive to the authentication response indicating successful authentication of the wireless device by the connecting device, the authentication reply containing second time information; and authenticating the connecting device based on the second time information.

In some exemplary methods, the first and second time information comprise one of the time of the first bump event, an elapsed time from the first bump event; or a time interval between first and second bumps in the bump event.

Some methods further comprise receiving user input indicating selection of user content to be exchanged with the connecting device; and transmitting the selected user content responsive to the bump event.

Other embodiments of the invention comprise wireless devices capable of exchanging data with a connecting device. One exemplary wireless device comprises a short-range radio transceiver for communicating with other wireless devices; and a processing circuit unit operatively connected to the transceiver. The processing circuit is configured to detect a bump event; exchange time information about the bump event with the connecting device; authenticate the connecting device based on the exchanged time information; and allow exchange of user data with the connecting device if the connecting device is successfully authenticated.

In some wireless devices, the processing circuit detects at least one of sound or motion associated with the bump event.

In some wireless devices, the time information comprises one of the time of the bump event, an elapsed time from the bump event; or a time interval between the first and second bumps in the bump event.

In some wireless devices, the processing circuit is further configured to generate a private session key from the first time information and encrypting/decrypting data exchanged with the connecting device using the private session key.

In some wireless devices, the processing circuit is configured to exchange first time information with the connecting device by sending an authentication request to the connecting device responsive to the bump event; and receive the first time information from the connecting device responsive to the authentication request.

In some wireless devices, the processing circuit is configured to exchange second time information with the connecting device by sending the second time information to the connecting device responsive to authentication of the connecting device.

In some wireless devices, the processing circuit is further configured to generate a private session key from at least one of the first and second time information; and encrypt/decrypt data exchanged with the connecting device using the private session key.

In some wireless devices, the second time information comprises one of the detected time of the bump event, an elapsed time from the bump event; or a time interval between the first and second bumps in the bump event.

In some wireless devices, the processing circuit is configured to exchange time information with the connecting device by receiving an authentication request from the connecting device; sending an authentication response containing first time information about the bump event to the connecting device responsive to the authentication request to authenticate the wireless device to the connecting device; receiving an authentication reply from the connecting device responsive to the authentication response indicating successful authentication of the wireless device by the connecting device, the authentication reply containing second time information; and authenticating the connecting device based on the second time information.

In some wireless devices, each of the first and second time information comprise one of the time of the first bump event, an elapsed time from the first bump event; or a time interval between first and second bumps in the bump event.

In some wireless devices, the processing circuit is further configured to receive user input indicating selection of user content to be exchanged with the connecting device; and transmit the selected user content responsive to the bump event.

Another exemplary method comprises detecting a bump event; receiving an authentication request from a connecting device responsive to the bump event; sending, responsive to the authentication request, an authentication response containing first time information about the bump event to the connecting device to authenticate the wireless device to the connecting device.

Another exemplary method comprises further comprises receiving, from the connecting device, an authentication reply responsive to the authentication response, the authentication reply containing second time information about the bump event; authenticating the connecting device based on the second time information; and allowing exchange of user data with the connecting device if the connecting device is successfully authenticated.

Another wireless device according to the present invention comprises a short-range radio transceiver for communicating with a other wireless devices; a processing circuit unit operatively connected to the transceiver. The processing circuit is configured to detect a bump event; receive an authentication request from a connecting device responsive to the bump event; send, responsive to the authentication request, an authentication response containing first time information about the bump event to the connecting device to authenticate the wireless device to the connecting device.

In one exemplary wireless device, the processing circuit is further configured to receive, from the connecting device, an authentication reply responsive to the authentication response, the authentication reply containing second time information about the bump event; authenticate the connecting device based on the second time information; and allow exchange of user data with the connecting device if the connecting device is successfully authenticated.

DETAILED DESCRIPTION

The present invention relates to a method of pairing wireless devices 10 to enable the exchange of data by the devices 10 over a short range radio interface. The wireless devices 10 may comprise, for example, cell phones, personal digital assistants, smart phones, handheld computers, audio or any other devices 10 having wireless communication capabilities.

Figure 1:
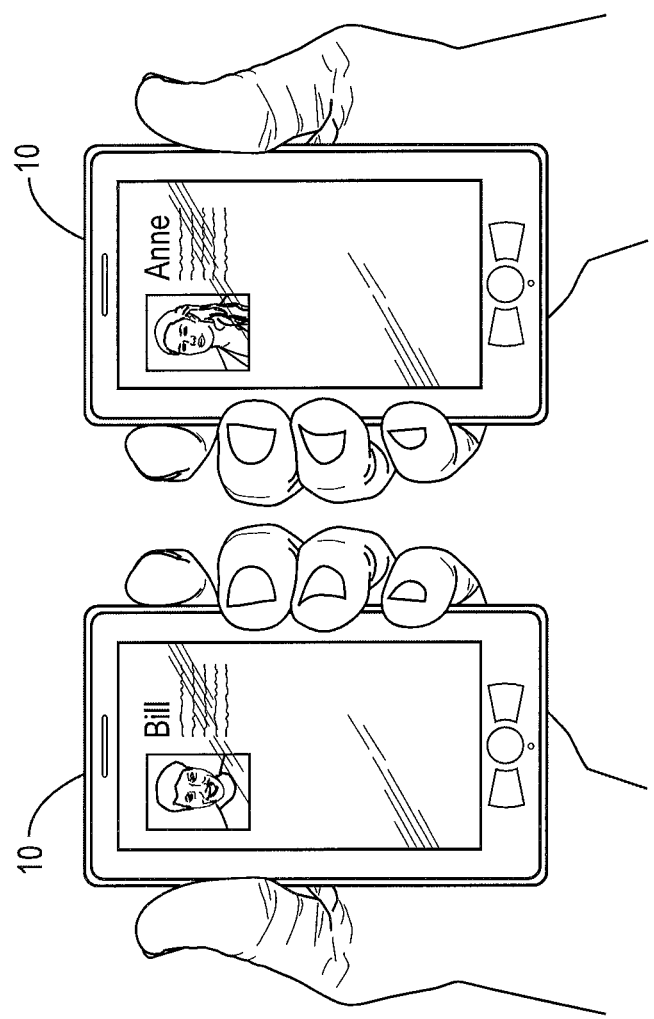
FIG. 1 illustrates two exemplary wireless devices being paired by bumping the wireless devices together.

FIG. 1 illustrates two smart phones owned by users (denoted as Ann and Bill) who wish to exchange contact information. For purposes of explanation, it is assumed that the smart phones each include a Bluetooth module that allows communication with other Bluetooth devices over short distances. Those skilled in the art will appreciate that other short range wireless communication technologies can also be used in the present invention. The Bluetooth standard includes a procedure called pairing to prevent connections from being established with unknown devices. The pairing procedure requires a user to confirm the user's desire to make the connection, typically by inputting a PIN or passcode for the connecting device. The present invention simplifies the pairing process from the user standpoint and eliminates the need for the user to input a PIN or passcode.

According to one embodiment of the present invention, the pairing procedure is initiated by a user action that implicitly indicates the user's desire to establish a connection between the user's own wireless device 10 and a connecting wireless device 10. For example, two users wishing to connect their wireless devices 10 to exchange data may bump their wireless devices 10 (or hands holding the wireless devices) together once or twice. The "bump" initiates the pairing process and time measurements relating to the "bump" are used for either unilateral or bilateral authentication. When the pairing procedure is finished, the wireless devices 10 are then authenticated to exchange user content, such as the contact information shown in FIG. 1. Any type of user content can be exchanged in this manner, including music files, ringtones, images, data files, and applications.

Figure 2:
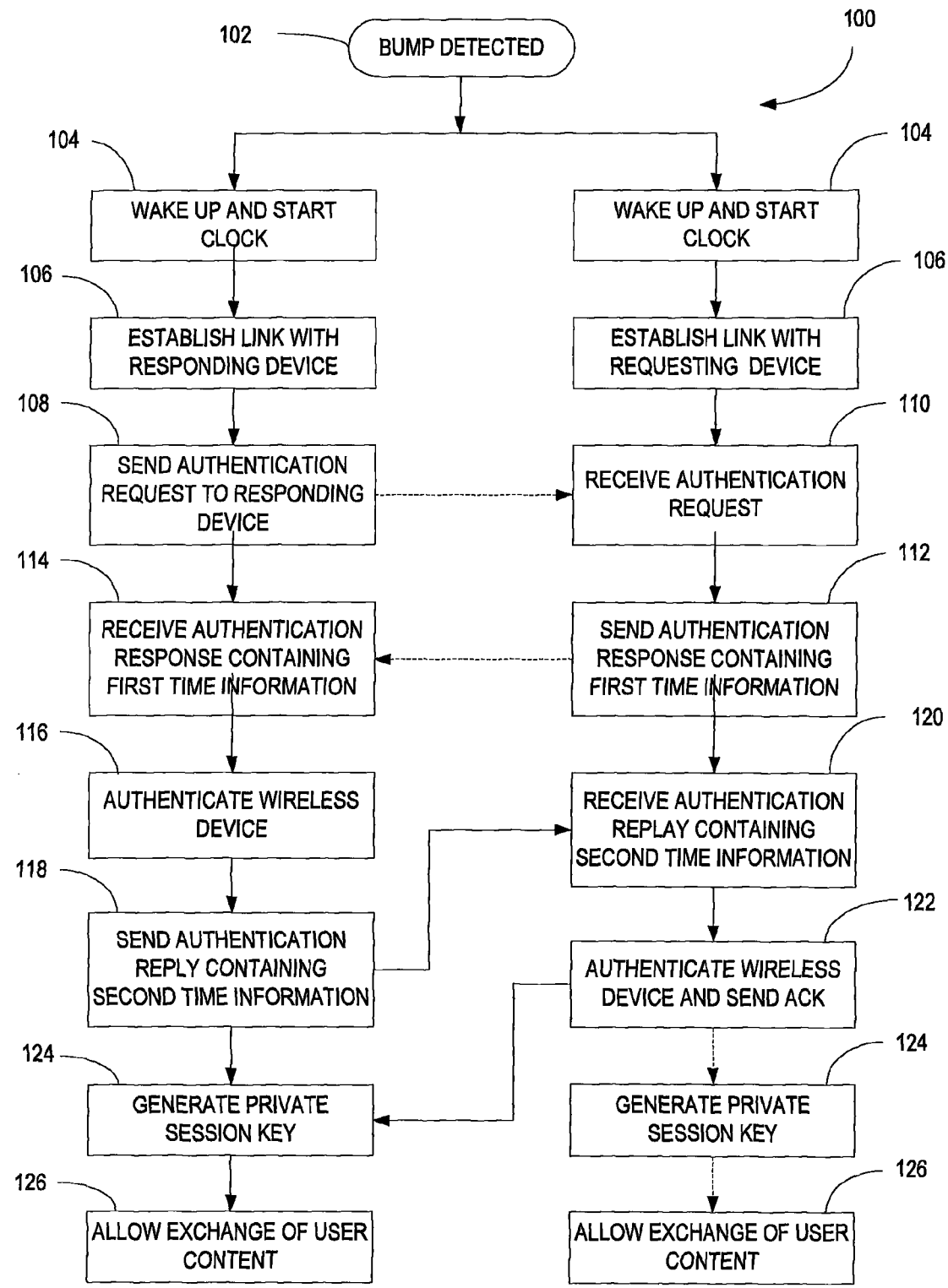
FIG. 2 illustrates an exemplary method for pairing wireless devices.

FIG. 2 illustrates an exemplary method 100 of pairing two wireless devices 10. During the pairing procedure, one of the wireless devices 10 functions as a requesting device 10 and the other functions as a responding device 10. The operations represented on the left side of FIG. 2 are performed by the requesting device 10, while the operations shown on the right side of FIG. 2 are performed by the responding device 10. It is assumed that the wireless devices 10 include a microphone, accelerometer, and/or other sensor to detect a triggering event, such as a bump. More generally, the triggering event can be any user initiated action that can be detected by the sensors of the wireless devices 10. Preferably, the triggering event is of a type that would not likely be detected by other nearby devices 10.

In the exemplary embodiments, the two wireless devices 10 are bumped together once or twice. The "bump event" is detected by microphones and/or accelerometers in the wireless devices 10 (block 102). In one embodiment, the sound generated by the bump event is detected by microphones. In addition to the sounds detected by microphones, the movement of one or both of the wireless devices 10 that produced the sound generating bump may be detected by an accelerometer in the wireless device 10.

In response to the bump event, the wireless devices 10 wake up if they are in a sleep mode and start a clock or timer (block 104). In one exemplary embodiment, a low level program running up both wireless devices 10 monitors the audio output from the microphone and/or electrical output of the accelerometer. The main processor of the wireless devices 10 can be dormant and activated by an interrupt signal from the microphone and/or accelerometer hardware. When sound or motion associated with a bump is detected, the first program wakes up the processor and starts a second program that analyzes the electrical signals output from the microphone and/or accelerometer. For example, the second program may compare the signals output by the microphone and/or accelerometer to a threshold and/or stored bump signatures to determine whether a bump event occurred. The bump signatures can be determined by experimentation and stored in the memory of the wireless devices. The bump signatures can be device dependent or device independent. Device dependent signatures can account for resonances in the wireless device and may be more reliable than device independent signatures at the expense of greater complexity. In one embodiment, the bump signatures may be related to a predetermined location on the wireless device so that pairing is initiated by bumping the wireless device at the predetermined location. The bump signatures provide the capability to filter out unintentional bumps and other typical bumps that occurs during ordinary use of the wireless devices.

If the bump event is confirmed, the second program starts a clock and initiates the pairing procedure. If the Bluetooth modules in the two devices 10 are off, the second program turns the Bluetooth modules on and begins searching for nearby devices 10. If the wireless devices 10 detect one another, the wireless devices 10 establish a radio link (block 106). If the wireless devices 10 do not detect other devices 10, the programs in the two wireless devices terminate.

After a radio link is established, the requesting device 10 sends an authentication request to the responding device 10 (block 108). When the responding device 10 receives the authentication request (block 110), it determines a first time measurement related to the bump event. For example, the first time measurement may comprise the elapsed time from the detection of the bump event, or, if the devices 10 are bumped twice, the time interval between the two bumps. The time measurement could also be a calculated value, such as the computed time of the bump event. The responding device 10 sends the first time measurement to the requesting device 10 in an authentication response (block 112).

When the requesting device 10 receives the authentication response (block 114), it verifies the accuracy of the first time measurement (block 116). More particularly, the requesting device 10 compares the time measurement received in the authentication response with its own time measurement to authenticate the responding device 10. If the time measurement received from the responding device 10 is within predetermined tolerance parameters (e.g. a few milliseconds), the requesting device 10 authenticates the responding device 10 and allows the exchange of user data. In cases where the unilateral authentication is sufficient, the authentication procedure can end at this point. For example, if a wireless device 10 such as a smart phone is being paired with a headset, unilateral authentication of the headset by the smart phone is sufficient for pairing. In such cases, the requesting device 10 sends an acknowledgement back to the responding device 10 to complete the authentication procedure.

In cases where bilateral authentication is needed, such as when two users are exchanging data, the requesting device 10 may transmit a second time measurement (e.g., the elapsed time or time interval between two bumps) to the responding device 10 in an authentication reply (block 118). When the responding device 10 receives the authentication reply (block 120), the responding device 10 compares the received time measurement with its own time measurements to verify the accuracy of the second time measurement to authenticate the requesting device 10 (block 122). If the second time measurement received from the requesting device 10 falls within predetermined tolerance parameters, the requesting device 10 is authenticated to the responding device 10 and the responding device 10 sends an acknowledgement message (ACK) to the requesting device 10 (block 122).

When both wireless devices are authenticated, the wireless devices may then optionally use the time measurements to generate a private session key for encrypting/decrypting communications (block 124). For example, the wireless devices 10 can input one or both time measurements into a predetermined key generation algorithm. Key generation algorithms are well known in the art and are described in Bruce Schneier, Applied Cryptography (2nd Ed.). To ensure that both devices use the same value as an input to the key generation algorithm, it may be necessary to round the time measurements to eliminate differences in the least significant bits of the time measurements. In one exemplary embodiment, the time interval measurement is rounded and used as an input because it is likely to be more accurate than the elapsed time measurement and thus requires less rounding to ensure that identical values are used.

After both devices 10 have been authenticated, the wireless devices 10 then allow the exchange of data between the authenticated devices (block 126). In one embodiment, preselected user content can be exchanged automatically upon successfully authenticating the connecting devices. In one exemplary embodiment, one or both users select via a user interface content to exchange with a connecting device. The user selection may occur prior to bumping the devices together. Alternatively, the users may be prompted to select content after the bump is detected. The process for selection of user content can be parallel to the authentication procedure. In other embodiments, no user selection of content is needed. For example, when a smart phone is being paired with a Bluetooth headset, the wireless device can allow exchange of voice data with the headset automatically without user input. Whether user selection is required for exchange of data may thus depend on the type of one or both of the connecting devices.

The exchange of time information related to the bump event protects both device 10 from a malicious third party or eavesdropper. A malicious third party could receive the authentication request from the requesting device 10, but would not likely be able to supply a correct time measurement. The responding device 10 is also protected because it receives a different time measurement. The exchange of user data does not begin until both devices 10 are properly authenticated.

As noted above, the wireless devices may use the time measurements exchanged during the pairing process may to generate a private session key for encrypting/decrypting user data exchanged between two wireless devices 10. For example, the time measurements exchanged during the pairing procedure may be input to a key generation algorithm that generates a common key that is known only to the two wireless devices 10 being paired. The resulting key may then be used as a private session key to encrypt and decrypt information exchanged between the paired wireless devices 10. Alternatively, only one of the two devices 10 may generate a private session key using the time measurements exchanged during the pairing procedure. The wireless device 10 that generates the session key may then obtain a public key for the other device 10, encrypt the private session key using the public key, and send the encrypted private session key to the other device 10.

Figure 3:
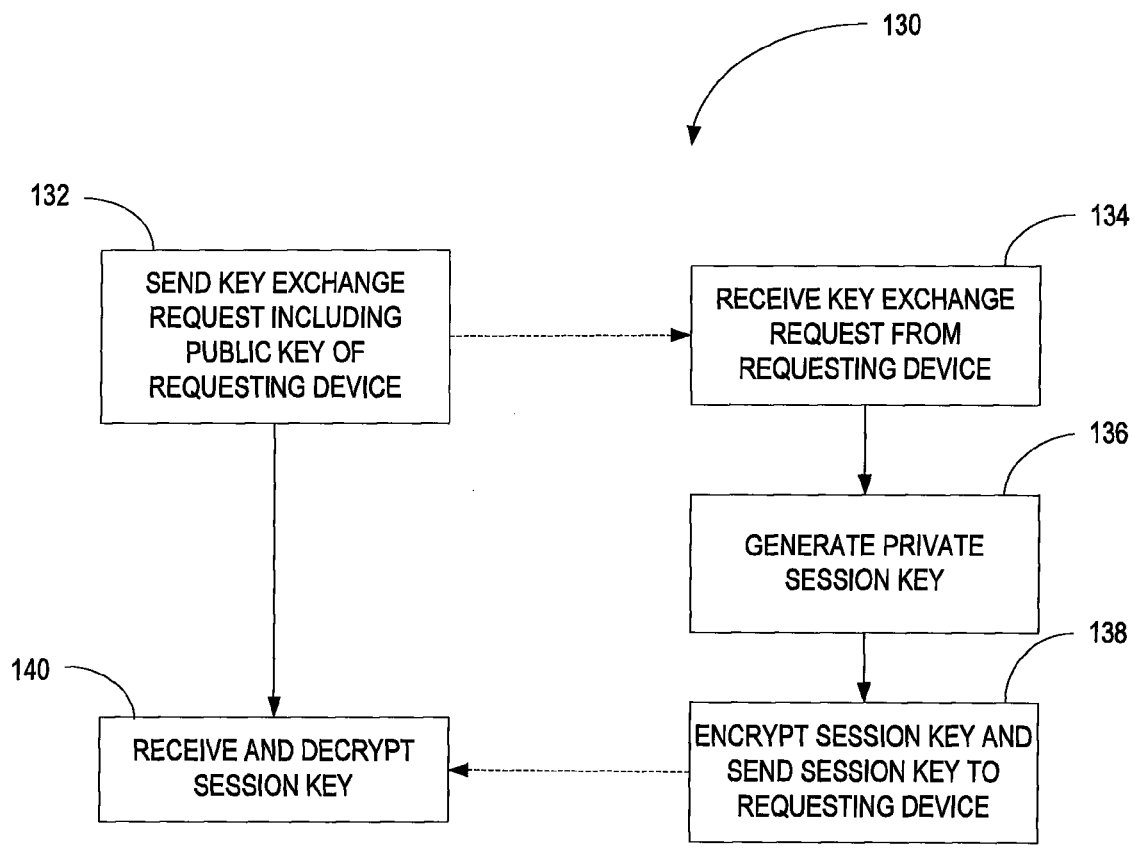
FIG. 3 illustrates an exemplary procedure for exchanging a private session key between two wireless devices during a pairing procedure.

FIG. 3 illustrates an exemplary key exchange procedure 130 according to one embodiment, which may be used at block 124 of FIG. 2 The requesting device 10 initiates the key exchange procedure by sending its public key to the responding device 10 (block 132). When the responding device receives the key exchange request (block 134), it uses the time measurements previously exchanged during the pairing procedure to compute a private session key (block 136). For example, one or more time measurements can be input to a hash algorithm to generate a secret key. The algorithm used for generating the private session key does not have to be known to the requesting device 10. The responding device 10 encrypts the private session key with the requesting device's public key and sends the encrypted key back to the requesting device 10 (block 138). The requesting device 10 receives and decrypts the private session key (block 140). Thus, both devices 10 have the same secret session key to use for subsequent secured data communications.

Figure 4:
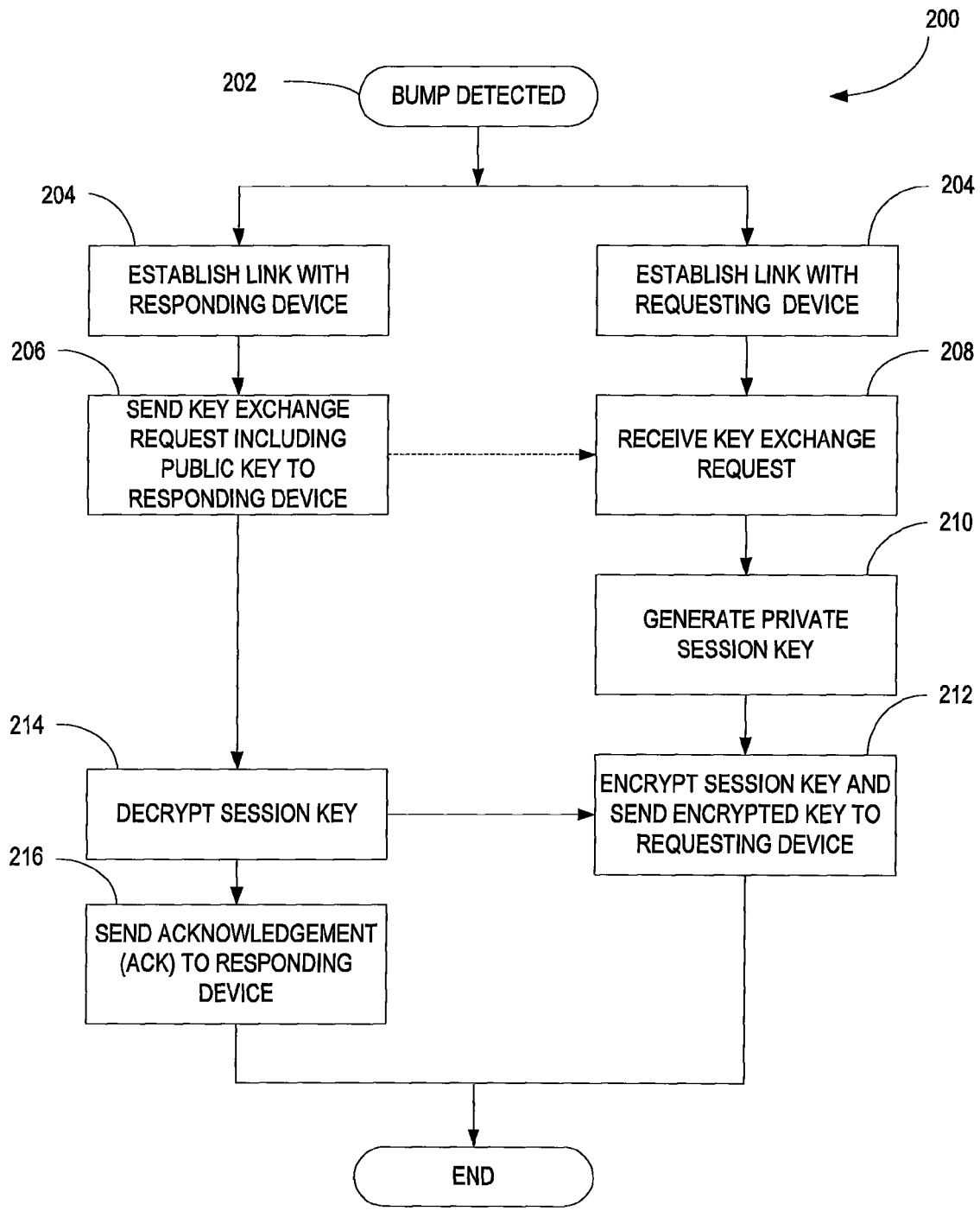
FIG. 4 illustrates an exemplary procedure for exchanging a private session key between two wireless devices.

Those skilled in the art will appreciate that the key exchange procedure shown in FIG. 3 can be performed independently of the authentication procedure. FIG. 4 shows an exemplary key exchange procedure 200 according to one embodiment. The key exchange process begins when the two devices 10 are bumped together. The bump may be detected by a microphone and/or accelerometer as previously described. In response to the detection of the bump event, the two wireless devices 10 establish a radio link (block 204). The requesting device 10 then sends a key exchange request to the responding device 10 (block 206). The key exchange request contains the public key of the requesting device 10. Upon receipt of the key request (block 208), the responding device 10 performs time measurements related to the bump event and uses the time measurements as an input to a key generation algorithm (block 210). The resulting session key is encrypted and sent back to the requesting device 10 in a key exchange response (block 212). The requesting device 10 decrypts the private session key (block 214) and sends an acknowledgement back to the responding device 10 to indicate the successful receipt of the session key (block 216).

In some embodiments of the invention, a session re-establishment procedure is provided for re-establishing a session that has been interrupted. If the session key is deemed to be secure, the session between the two devices 10 may be re-established by bumping the devices 10 together. If the previous session key is judged to be insecure, the devices 10 may need to repeat the pairing process previously described. Thus, secure reconnections can be made automatically by bumping the two phones together as long as the private session key remains valid.

Figure 5:
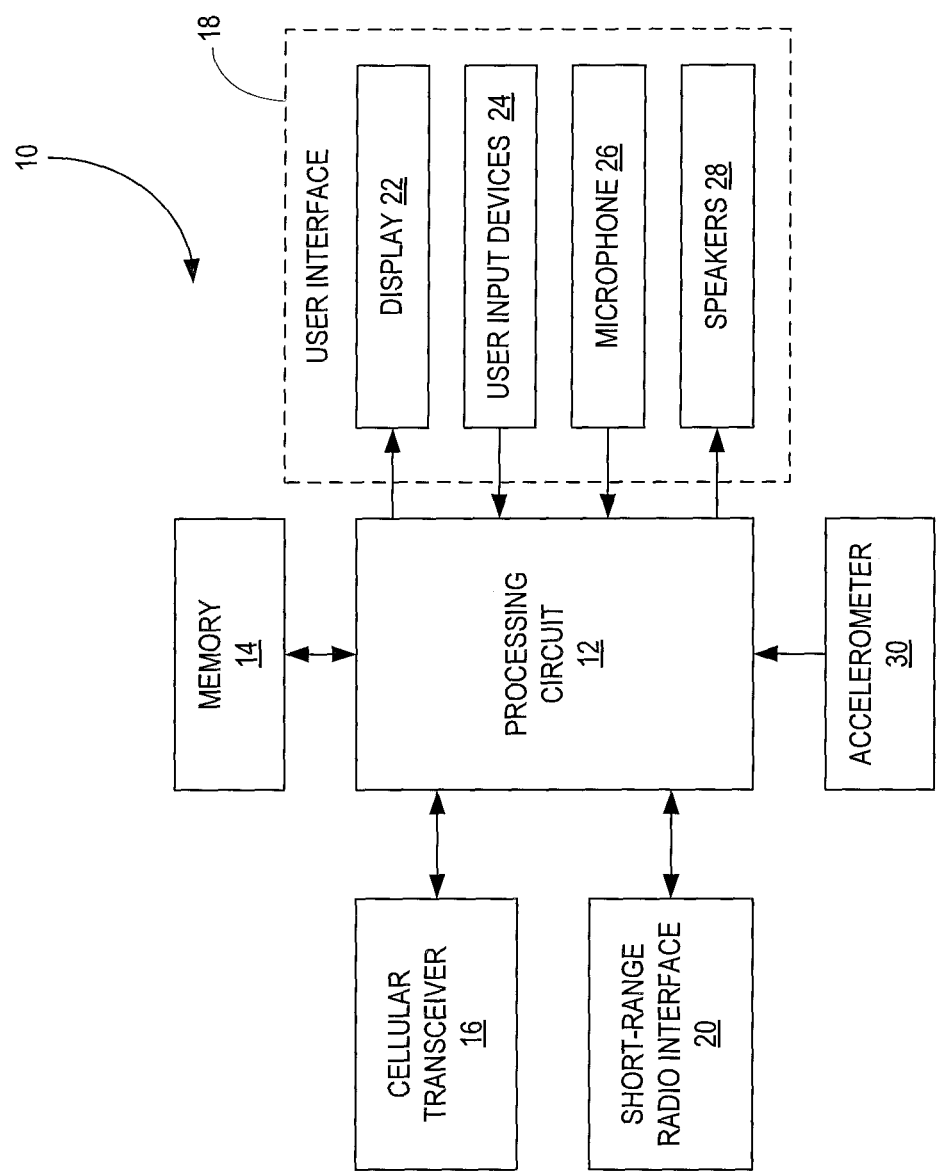
FIG. 5 illustrates an exemplary wireless device.

FIG. 5 illustrates the main functional components of an exemplary wireless device 10 according to one embodiment of the present invention. The wireless device 10 comprises processing circuits 12, memory 14, cellular transceiver 16, user interface 18, and short-range radio interface 20. The processing circuit 12 comprises one or more microprocessors, microcontrollers, hardware, or a combination thereof. Processing circuits 12 execute programs and applications stored in memory 14, process signals transmitted and received by the wireless device, and control the overall operation of the wireless device 10 as described above. Memory comprises one or more memory devices to store programs and data needed for operation on either a temporary or permanent, or semi-permanent basis. Memory devices may include, for example volatile memory (e.g., RAM) and/or nonvolatile memory (ROM, EEPROM, Flash). Cellular transceiver 16 is a fully functional cellular transceiver to enable the wireless device to communicate over cellular networks such as Wideband Code Division Multiple Access (WCDMA) networks, Long Term Evolution (LTE) networks, or WiMAX networks. User interface 18 include input and output device to enable a user to interact with and control the wireless device. The user interface may include for example, a display 22 to output information for viewing by the user and one or more input devices 24 such as keypads, dials, wheels, function keys, touch pads, etc. Some devices 10 may include a touch screen display that also functions as an input device. The user interface 18 may also include a microphone 24 to convert audible sounds into audio signals for input to the processing circuits 12, and one or more speakers 28 to convert audio signals output by the processing circuit 12 into audible sounds that can be heard by the user. Short-range radio interface 20 includes any type of radio interface, such as a Bluetooth interface, that enables connections with other nearby devices. The wireless device 10 may further include a motion sensor 30, such as an accelerometer, to detect movement of the wireless communication device.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless device of pairing with a connecting device, the method comprising:
   detecting a bump event, wherein the bump event can be based on either sound or motion;
   sending an authentication request to the connecting device responsive to the bump event;
   receiving first time information from the connecting device responsive to the authentication request;
   authenticating the connecting device based on the first time information;
   sending an authentication reply to the connecting device responsive to authenticating the connecting device, said authentication reply containing second time information about the bump event to authenticate the wireless device to the connecting device; and
   allowing exchange of user data with the connecting device upon receiving an acknowledgement that the wireless device was successfully authenticated by the connecting device.

2. The method of claim 1 wherein detecting a bump event comprises detecting at least one of sound or motion associated with the bump event.

3. The method of claim 1 wherein each of the first and second time information comprises one of the time of the bump event, an elapsed time from the bump event; or a time interval between the first and second bumps in the bump event.

4. The method of claim 1 further comprising:
   generating a private session key from at least one of the first and second time information; and
   encrypting/decrypting data exchanged with the connecting device using the private session key.

5. The method of claim 1 further comprising:
   receiving user input indicating selection of user content to be exchanged with the connecting device; and
   transmitting the selected user content responsive to the bump event.

6. A wireless device capable of exchanging data with a connecting device, the wireless device comprising:
   a short-range radio transceiver for communicating with other wireless devices;
   a processing circuit unit operatively connected to the transceiver and configured to:
     detect a bump event, wherein the bump event can be based on either sound or motion;
     send an authentication request to the connecting device responsive to the bump event;
     receive first time information from the connecting device responsive to the authentication request;
     authenticate the connecting device based on the first time information;
     send an authentication reply to the connecting device responsive to authenticating the connecting device, said authentication replay containing second time information about the bump event to authenticate the wireless device to the connecting device; and
     allow exchange of user data with the connecting device upon receiving an acknowledgement that the wireless device was successfully authenticated by the connecting device.

7. The wireless device of claim 6 wherein the processing circuit detects at least one of sound or motion associated with the bump event.

8. The wireless device of claim 6 wherein each of the first and second time information comprises one of the time of the bump event, an elapsed time from the bump event; or a time interval between the first and second bumps in the bump event.

9. The wireless device of claim 6 wherein the processing circuit is further configured to:
   generate a private session key from at least one of the first and second time information; and
   encrypt/decrypt data exchanged with the connecting device using the private session key.

10. The wireless device of claim 6 wherein the processing circuit is further configured to:
    receive user input indicating selection of user content to be exchanged with the connecting device; and
    transmit the selected user content responsive to the bump event.

11. A method implemented by a wireless device of pairing with a connecting device, the method comprising:
    detecting a bump event, wherein the bump event can be based on either sound or motion;
    receiving an authentication request from a connecting device responsive to the bump event;
    sending, responsive to the authentication request, an authentication response containing first time information about the bump event to the connecting device to authenticate the wireless device to the connecting device;
    receiving, from the connecting device, an authentication reply responsive to the authentication response, the authentication reply containing second time information about the bump event;
    authenticating the connecting device based on the second time information; and
    allowing exchange of user data with the connecting device if the connecting device is successfully authenticated.

12. The method of claim 11 wherein the processing circuit detects at least one of sound or motion associated with the bump event.

13. The method of claim 11 wherein each of the first and second time information comprises one of the time of the bump event, an elapsed time from the bump event; or a time interval between the first and second bumps in the bump event.

14. The method of claim 11 wherein the processing circuit is further configured to:
    generate a private session key from at least one of the first and second time information; and
    encrypt/decrypt data exchanged with the connecting device using the private session key.

15. The method of claim 11 wherein the processing circuit is further configured to:
    receive user input indicating selection of user content to be exchanged with the connecting device; and
    transmit the selected user content responsive to the bump event.

16. A wireless device comprising:
    a short-range radio transceiver for communicating with other wireless devices;
    a processing circuit unit operatively connected to the transceiver and configured to:
      detect a bump event, wherein the bump event can be based on either sound or motion;
      receive an authentication request from a connecting device responsive to the bump event;
      send, responsive to the authentication request, an authentication response containing first time information about the bump event to the connecting device to authenticate the wireless device to the connecting device;

receive, from the connecting device, an authentication reply responsive to the authentication response, the authentication reply containing second time information about the bump event;

authenticate the connecting device based on the second time information; and allow exchange of user data with the connecting device if the connecting device is successfully authenticated.

17. The device of claim 16 wherein detecting a bump event comprises detecting at least one of sound or motion associated with the bump event.

18. The device of claim 16 wherein the time information comprises one of the time of the bump event, an elapsed time from the bump event; or a time interval between the first and second bumps in the bump event.

19. The device of claim 16 further comprising:

generating a private session key from at least one of the first and second time information; and encrypting/decrypting data exchanged with the connecting device using the private session key.

20. The device of claim 16 further comprising:

receiving user input indicating selection of user content to be exchanged with the connecting device; and transmitting the selected user content responsive to the bump event.

* * * * *